United States Patent [19]

Nakamura et al.

[11] Patent Number: 5,352,964
[45] Date of Patent: Oct. 4, 1994

[54] CONTROLLING METHOD AND APPARATUS FOR ACTUATING INDUCTION MOTOR

[75] Inventors: Kosei Nakamura, Oshino; Yukio Katsuzawa, Minamitsuru; Yasuyuki Nakazawa, Oahino, all of Japan

[73] Assignee: Fanuc Ltd., Yamanashi, Japan

[21] Appl. No.: 971,969

[22] PCT Filed: Jul. 6, 1992

[86] PCT No.: PCT/JP92/00855
§ 371 Date: Feb. 19, 1993
§ 102(e) Date: Feb. 19, 1993

[87] PCT Pub. No.: WO93/01653
PCT Pub. Date: Jan. 21, 1993

[30] Foreign Application Priority Data

Jul. 5, 1991 [JP] Japan .................................. 3-191293

[51] Int. Cl.$^5$ .............................................. H02P 7/36
[52] U.S. Cl. ...................................... 318/772; 318/771
[58] Field of Search ............... 318/767, 770, 771, 772, 318/780

[56] References Cited

U.S. PATENT DOCUMENTS 1,074,125  9/1913  Lamme .
1,992,050  2/1935  Alger .
2,773,230 12/1956  Emley .
5,068,587 11/1991  Nakamura .

FOREIGN PATENT DOCUMENTS 56-171598 12/1981 Japan .
61-161991  7/1986 Japan .
1-214293   8/1989 Japan .

Primary Examiner—Bentsu Ro
Attorney, Agent, or Firm—Staas & Halsey

[57] ABSTRACT

A control method and apparatus for actuating an induction motor which is capable of generating a sufficiently large output in a wide speed region. In such an induction motor, each of Y-connection phase windings of the induction motor is divided into two split windings 5$t$ and 3$t$ at a predetermined split ratio (for example, 5:3). When a rotational speed of the induction motor is in a low speed region, only the changeover switch MC2 is turned on to supply exciting current to both of the split windings 5$t$ and 3$t$. When the rotational speed of the induction motor is in a middle speed region, only the changeover switch MC3 is turned on to exclusively supply exciting current to the split windings 5$t$. Furthermore, when the rotational speed of the induction motor is in a high speed region, only the changeover switch MC1 is turned on to exclusively supply exciting current to the split windings 3$t$. With this arrangement, three different numbers of turns can selectively be used with respect to each phase winding so that relatively large number of turns can be used for the rotation in the low speed region, while relatively small number of turns can be used for the rotation in the high speed region in order to accomplish the desired control the actuation of the induction motor.

5 Claims, 2 Drawing Sheets

CONTROLLING METHOD AND APPARATUS FOR ACTUATING INDUCTION MOTOR

BACKGROUND OF THE INVENTION

1. Field of the Invention

The present invention relates to a controlling method and apparatus for actuating an induction motor, and more particularly to an actuating control method for an induction motor suitably applied for controlling a main shaft of a machine tool, which requires a predetermined output in a wide speed region ranging from a low speed to a high speed.

2. Description of the Related Art

A recent induction motor is designed so that a large torque can be obtained in a low speed region with the same primary current value by use of a switching control of primary windings and a slip control.

That is, in a conventional switching operation for the primary windings, there are provided two terminals so that primary windings of Y—Y connection of respective phases are supplied with exciting current from these two terminals. A first terminal is provided to fully supply exciting current to primary winding of each phase for rotation. While a second terminal is provided at an intermediate point of each primary winding so as to supply the exciting current to a part of each primary winding.

Then, the switching operation of the primary windings is carried out in such a manner that electric power is only supplied from the first terminal in the case where a rotational speed of the motor is low, so that each phase winding is fully supplied with exciting current. And, electric power is only supplied from the second terminal in the case where the rotational speed of the motor is high, so that each phase winding is partly supplied with exciting current.

In the case where the motor is controlled through the switching operation of the primary windings as is described above, there was a problem such that an undesirable drop of output occurs when the primary winding is switched from a low-speed winding to a high-speed winding or vice versa where the extent of a rotational speed region exceeds a certain limit, thereby causing a problem such that a constant output cannot be obtained throughout a wide speed region.

FIG. 4 (PRIOR ART) is a graph showing an output characteristics of the motor in relation to its rotational speed, where the actuation of the motor is controlled on the basis of such a switching operation of the primary windings. As shown in FIG. 4, an output of the motor will not increase proportionally even when the rotational speed of the motor is increased to a relatively high speed range as far as the motor is actuated by the low-speed windings.

Thus, even when the winding is switched to the high-speed windings from the low-speed windings, an output necessary for obtaining a predetermined torque will not be generated as far as the rotational speed of the motor is within the relatively low-speed range of the speed region available by the high-speed windings. For this reason, there will occur an output reduction whose phenomenon is shown in FIG. 4 as area a filled with slant lines.

SUMMARY OF THE INVENTION

An object of the present invention is to provide a controlling method and apparatus for actuating an induction motor capable of preventing the occurrence of the above-described output reduction area.

The present invention provides a control apparatus for actuating an induction motor comprising: phase windings of Y-connection type each having one end connected to an electric power supply terminal and the other end connected to a neutral point; a first and a second split windings, which are formed by splitting each of said windings at a predetermined split ratio based on the number of turns of winding, and the split points of said split windings are respectively connected to a first and a second intermediate terminals; a first changeover switch interposed between said first intermediate terminal of each phase and said electric power supply terminal; a second changeover switch interposed between said first and second intermediate terminals of each phase; a third changeover switch interposed between said second intermediate terminals of said second split windings; and a switching control means for on-off controlling said first, second and third switches in accordance with a rotational speed of said induction motor.

Furthermore, according to the present invention, in controlling the actuation of the induction motor with above-described apparatus, when the rotational speed of the motor is in a low speed region, only the second changeover switch is turned on to increase a number of turns of each phase winding to its maximum value so that a large torque can be generated even in the low speed region. On the other hand, in the case where the rotational speed of the motor is in a middle speed region, only either the first or the third changeover switch is turned on to exclusively supply exciting current to the split winding having a larger number of turns so that a large torque can be generated in the middle speed region too.

Still further, in the case where the rotational speed of the motor is in a high speed region, only whichever unused of either the first or the third changeover switch is turned on to exclusively supply exciting current to the unused split winding having a smaller number of turns so that a large torque can similarly be generated in the high speed region.

DETAILED DESCRIPTION OF THE PREFERRED EMBODIMENTS

Figure 1:
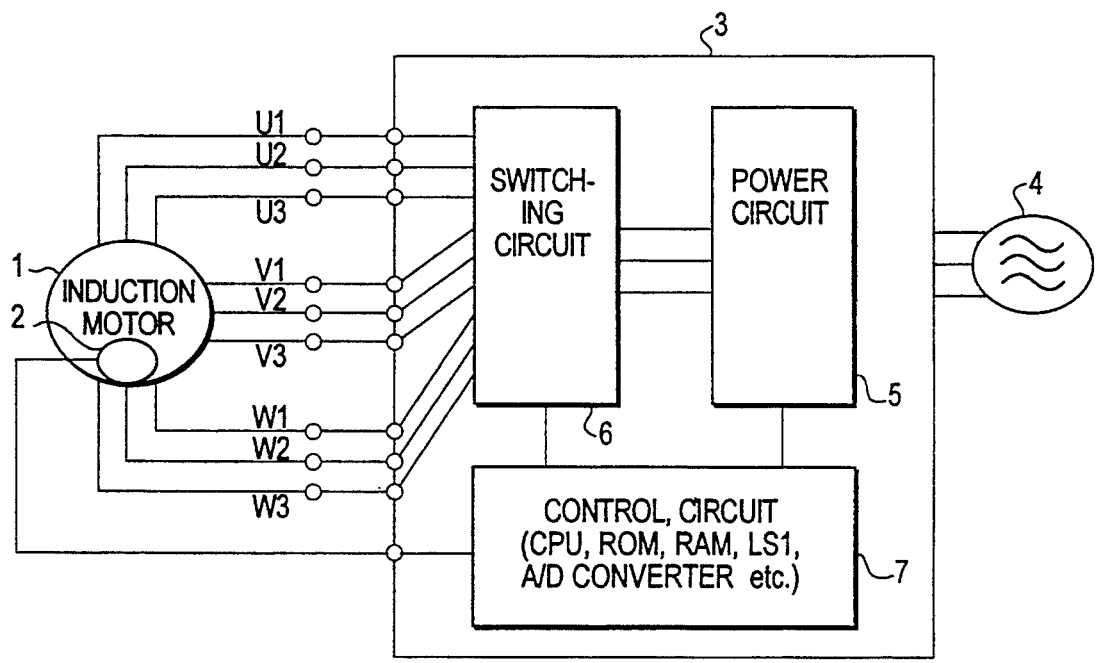
FIG. 1 is a block diagram showing an actuation control system for induction motor in accordance with one embodiment of the present invention.

In FIG. 1, three phase windings U, V and W of an induction motor 1 are connected to constitute a Y—Y connection. As will be described later, three winding terminals U1, V1 and W1, and six intermediate terminals U2, U3, V2, V3, W2 and W3 are provided in these phase windings U, V and W, respectively.

These terminals are connected to a switching circuit 6 contained in a motor controller 3. This switching circuit 6 includes three change-over switches MC1 to MC3 (refer to FIG. 2) respectively for each of three phases. These changeover switches may be either electromagnetic contactors or a TRIAC's (triode AC switch as a non-contact switch). A power circuit 5 is constituted of components such as a transistor inverter and the like, and supplies electric power through the switching circuit 6 to respective phase windings of the induction motor 1.

A control circuit 7 includes a processor (CPU), memory means such as ROM, RAM, an LSI, an A/D converter etc. in order to control the power circuit 5. A rotational speed sensor 2 detects a rotational speed of the induction motor 1. The control circuit 7 further controls the motor 1 by selectively turning on three changeover switches MC1 to MC3 provided in the switching circuit 6 in accordance with the rotational speed detected through the rotational speed sensor 2. A three-phase AC electric power source 4 supplies electric power to the motor controller 3.

The above-described induction motor actuation control system differs from a conventional induction motor actuating system in that each phase winding in the motor 1 is equipped with three terminals unlike the conventional induction motor actuation control system which is provided with only two terminals, and further in that the present system carries out a switching operation with respect to above-described three terminals, while the conventional system carries out a switching operation with respect to only two terminals.

Figure 2:
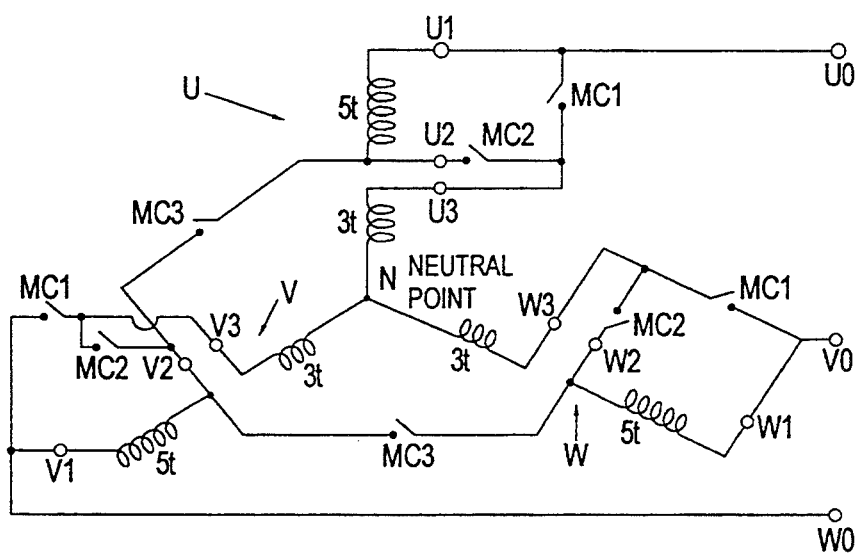
FIG. 2 is an explanatory view showing how respective phase windings of the induction motor, terminals, changeover switches of the switching circuit 6 are connected to each other.

Next, with reference to FIG. 2, how respective phase windings of the induction motor 1, terminals, changeover switches of the switching circuit 6 are connected to each other will be explained in detail.

Respective phase windings of U, V and W phases are connected to each other to constitute a Y—Y connection. Each of these three phase windings of U, V and W phases is divided into two split windings 3$t$ and 5$t$ having a split ratio of 3:5. Namely, one split winding whose number of turns is smaller is designated by the reference numeral 3$t$, and the other split winding whose number of turns is larger is designated by the reference numeral 5$t$.

One end of respective split windings 3$t$ are connected together to a neutral point N, and the other ends of these split windings 3$t$ are connected to the intermediate terminals U3, V3 and W3, respectively, so as to be led out of the motor 1.

On the other hand, the split points of the split windings 5$t$ are connected to the intermediate terminals U2, V2 and W2, respectively to be led out of the motor 1. Furthermore, winding terminals U1, V1 and W1 are directly connected to the terminals U0, V0 and W0 to which the power circuit 5 supplies electric power.

The intermediate terminals U3, V3 and W3 are connected to these electric power supply terminals U0, V0 and W0 via the contact points of changeover switches MC1 provided in the switching circuit 6, respectively. The intermediate terminals U2, V2 and W2 are connected to the intermediate terminals U3, V3 and W3 via the contact points of changeover switches MC2, respectively. Furthermore, the intermediate terminals U2, V2 and W2 are connected to each other via the contact points of changeover switches MC3.

As respective phase windings of the induction motor 1 are disposed and connected to respective switches as described above, when only the changeover switches MC1 are turned on, while other changeover switches MC2 and MC3 are turned off, electric power is supplied from the electric power supply terminals U0, V0 and W0 to the intermediate terminals U3, V3 and W3 via the contact points of the changeover switches MC1 so as to exclusively activate the split windings 3$t$ of U, V and W phases.

On the other hand, when only the changeover switches MC2 are turned on, while other changeover switches MC1 and MC3 are turned off, electric power is supplied to winding terminals U1, V1 and W1, and the split windings 5$t$ and 3$t$ of respective phases, or all the windings of respective phases, will be activated.

Furthermore, when only the changeover switches MC3 are turned on, while other changeover switches MC1 and MC2 are turned off, respective intermediate terminals U2, V2 and W2 are connected to each other through the contacts of the changeover switches MC3. Thus, this connecting point becomes a neutral point, and electric power is supplied from winding terminals U1, V1 and W1, and therefore only the split windings 5$t$ of respective phases are exclusively activated.

Accordingly, the rotational speed region of the induction motor 1 is divided into three regions of low speed, middle speed and high speed so that above-described changeover switches MC1, MC2 and MC3 can be on-off controlled in these three regions in accordance with the following table.

TABLE 1

| Changeover switch | MC1 | MC2 | MC3 |
|---|---|---|---|
| low speed region | off | on | off |
| middle speed region | off | off | on |
| high speed region | on | off | off |

Figure 3:
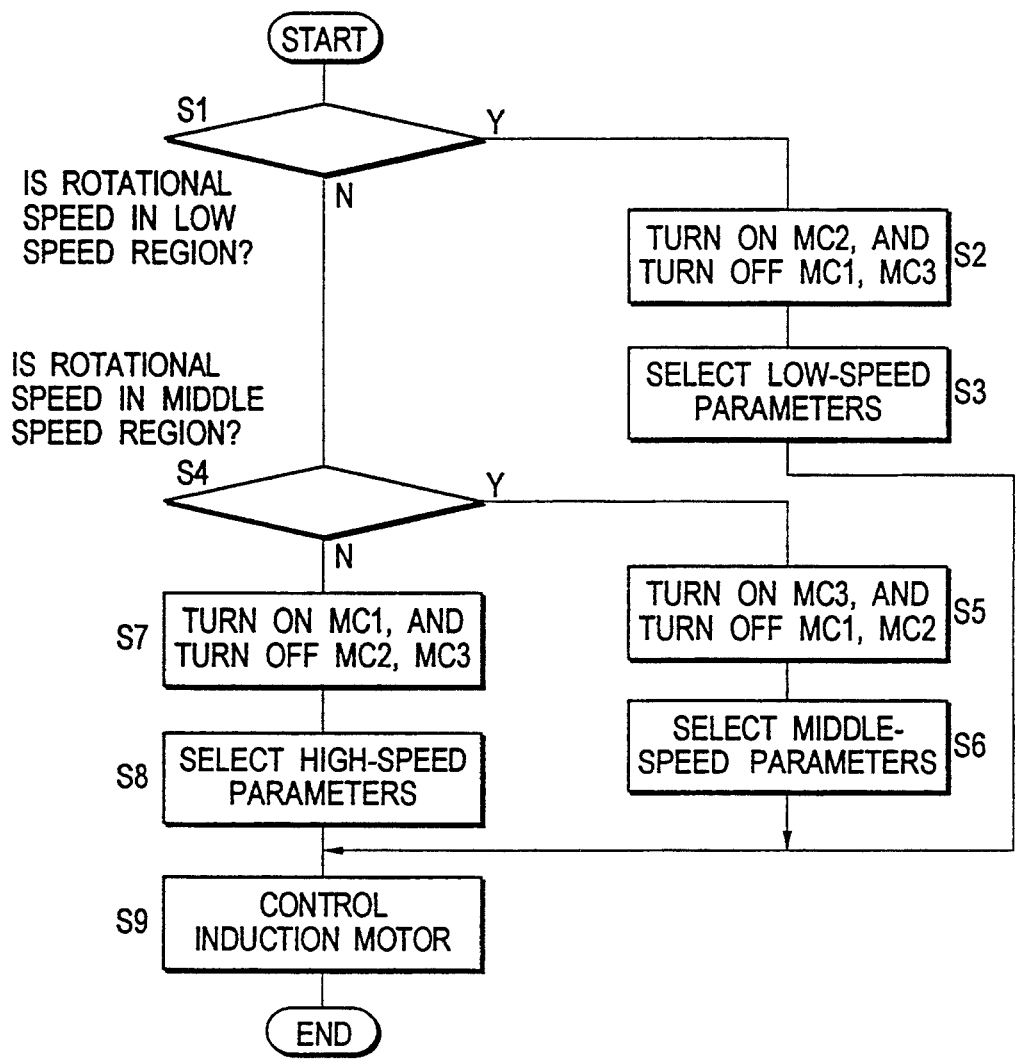
FIG. 3 is a flow chart showing a processing for controlling the induction motor to be executed on the processor equipped in the control circuit in accordance with this embodiment.
Figure 4:
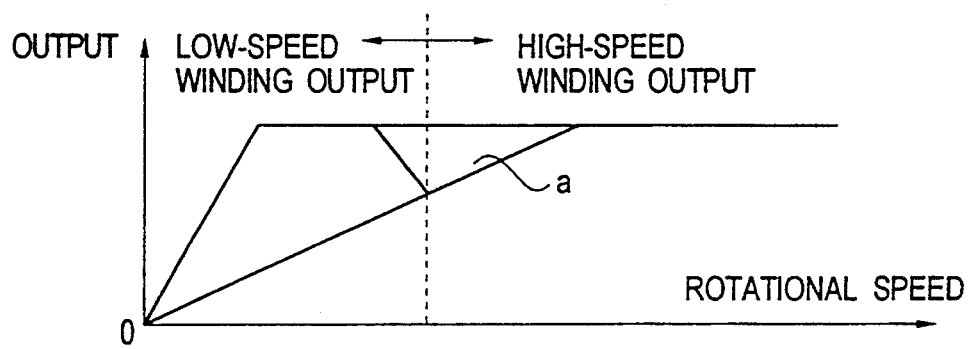
FIG. 4 is a graph showing an output characteristics in relation to a rotational speed of the motor, whose actuation is controlled on the basis of a conventional switching operation of the windings.

Then, FIG. 3 is a flow chart showing a processing for controlling the induction motor to be executed on the processor equipped in the control circuit 7 of the controller 3. The processor executes this processing for a predetermined period.

First of all, various parameters necessary for controlling the motor in respective speed regions of low speed, middle speed, and high speed are stored in the memory equipped in the control circuit. More specifically, current gain to be used in current loop processing, slip gain to be used in slip control, voltage gain to be used in voltage control and rotational speed gain to be used in speed control are set and stored in the memory.

Then, when the electric power source is turned on to actuate the induction motor, in step S1, the processor in the control circuit 7 will judge whether or not the rotational speed detected by the rotational speed sensor 2 is equal to or less than a speed value preset as a switching threshold speed from the low speed region to the middle speed region.

If the rotational speed of the motor 1 is in the low speed region, in step S2, the processor outputs a signal to turn on the changeover switch MC2 and turn off the changeover switches MC1 and MC3 respectively contained in the switching circuit 6 to cause the changeover switches MC2 to be turned on, and the changeover switches MC1 and MC3 to be turned off, respectively.

As a result, all the split windings 5$t$ and 3$t$ of U, V and W phases are supplied with exciting current. Therefore, a sufficiently large torque can be obtained in this low speed region. Subsequently, in step S3, the processor reads in various low speed parameters stored in the memory.

Next, the processor proceeds to step S9 to control the power circuit 5 on the basis of these low speed parameters in the same manner as the conventional system to actuate the induction motor.

As is described above, in the case where the rotational speed detected by the rotational speed sensor 2 installed in the motor 1 is in the low speed region, the processor repeatedly execute each processing defined by the steps S1, S2, S3 and S9 in the succeeding processing periods.

On the other hand, if it is detected that the rotational speed of the motor 1 is in a middle speed region defined by the above-described speed value being set as the switching threshold speed from the low speed region to the middle speed region and another speed value being set as the switching threshold speed from the middle speed region to the high speed region in a step S4, the processor outputs a signal to turn on the changeover switches MC3 and turn off the changeover switches MC1 and MC2 so that only the split windings 5t of U, V and W phases are exclusively supplied with exciting current for excitation. Thereafter, in step S6, the processor reads in various middle speed parameters stored in the memory to control the power circuit 5 in actuating the induction motor 1.

In this case, as the substantial number of turns actually excited in each phase winding becomes smaller than that in the case of the actuation in the low speed region, the induction motor can generate a large torque even in a higher speed region compared with the case of the actuation in the low speed region.

Furthermore, if the rotational speed detected by the rotational sensor 2 is equal to or larger than the speed value defined as the threshold speed from the middle speed to the high speed (i.e. if it is judged that the rotational speed is neither in the low speed region nor in the middle speed region), the processor proceeds to step S7 to turn on the changeover switches MC1 and turn off the changeover switches MC2 and MC3.

Then, in step S8, the processor reads in various high speed parameters stored in the memory and controls the power circuit 5 to actuate the induction motor 1 according to these high speed parameters.

In this case, only the changeover switches MC1 are turned on, so that the split windings 3t of respective phases are exclusively supplied with exciting current. Thus, the induction motor will become able to generate a large torque in this high speed region.

Further, according to the above embodiment, though the number of turns of the split winding connected to the neutral point is made smaller than the number of turns of the split winding connected to the winding terminal; however, this arrangement may be reversed.

In such a case, however, only the changeover switch MC1 is turned on in the middle speed region, and only the changeover switch MC3 is turned on in the high speed region.

Moreover, according to the above-described embodiment, each phase winding is divided into two at a predetermined ratio; however, the phase winding can be divided into more than two so that the number of turns of winding to be supplied with the current can be selected according to the rotational speed of the induction motor.

However, as disclosed in the above-described embodiment, even if the winding is divided into only two, a constant output can be obtained in a speed region ranging wide enough.

According to the present invention, each phase winding is divided into two split windings having a predetermined split ratio; each split winding is selectively supplied with exciting current through the switching operation of changeover switches in response to the rotational speed of the induction motor; three different numbers of turns can selectively be used with respect to each phase winding so that relatively large number of turns can be used for the rotation in the low speed region, while relatively small number of turns can be used for the rotation in the high speed region, whereby large torque can be obtained throughout the low speed region, middle speed region and high speed region; and, as a result, constant output can be obtained throughout a wide speed region.

What is claimed is:

1. A control apparatus for actuating an induction motor comprising:
   respective phase windings of a Y-connection type each having one end connected to an electric power supply terminal and the other end connected to a neutral point;
   a first split winding and a second split winding for each said respective phase windings, which are formed by splitting each of said respective phase windings at a predetermined split ratio based on a number of turns of winding, split points of said first and second split windings being respectively connected to a first intermediate terminal and a second intermediate terminal;
   a first changeover switch connected between said first intermediate terminals of each said respective phase windings and said electric power supply terminal, to supply electric power to said first split winding only;
   a second changeover switch connected between said first and second intermediate terminals of each said respective phase windings, to supply electric power to both said first and second split windings;
   a third changeover switch connected between said second intermediate terminals of said second split windings, to supply electric power to said second split winding only; and
   a switching control means for on-off controlling said first, second and third switches in accordance with a rotational speed of said induction motor.

2. A control method for controlling an induction motor with an actuation control apparatus for the induction motor comprising: phase windings of a Y-connection type each having one end connected to an electric power supply terminal and the other end to a neutral point; a first and a second split windings for each said phase windings, which are formed by splitting each of said phase windings at a predetermined split ratio based on a number of turns of winding, split points of said first and second split windings being respectively connected to a first and second intermediate terminals; a first changeover switch connected between said first intermediate terminals of each said phase windings and said electric power supply terminal; a second changeover switch connected between said first and second intermediate terminals of each said phase winding; a third changeover switch connected between said second intermediate terminals of said second split windings; and a switching control means for on-off controlling said first, second and third switches based on a rotational speed of said induction motor; said controlling method comprising the steps of:

turning on said second changeover switch and turning off said first and third changeover switches in a case where the rotational speed of the induction motor is in a low speed region;

turning on said third changeover switch and turning off said first and second changeover switches in a case where the rotational speed of the induction motor is in a middle speed region; and turning on said first changeover switch and turning off said second and third changeover switches in a case where the rotational speed of the induction motor is in a high speed region.

3. A control method for actuating an induction motor in accordance with claim 2, wherein said second split winding has a larger number of turns than said first split winding.

4. A control method for controlling an induction motor with an actuation control apparatus for the induction motor comprising: phase windings of a Y-connection type each having one end connected to an electric power supply terminal and the other end to a neutral point; a first and a second split windings for each said phase windings, which are formed by splitting each of said phase windings at a predetermined split ration based on a number of turns of winding, split points of said first and second split windings being respectively connected to a first and second intermediate terminals; a first changeover switch connected between said first intermediate terminals of each said phase windings and said electric power supply terminals; a second changeover switch connected between said first and second intermediate terminals of each said phase winding; a third changeover switch connected between said second intermediate terminals of said second split windings; and a switching control means for on-off controlling said first, second and third switches based on a rotational speed of said induction motor; said controlling method comprising the steps of:

turning on said second changeover switch and turning off said first and third changeover switches in a case where the rotational speed of the induction motor is in a low speed region;

turning on said first changeover switch and turning off said second and third changeover switches in a case where the rotational speed of the induction motor is in a middle speed region; and turning on said third changeover switch and turning off said first and second changeover switches in a case where the rotational speed of the induction motor is in a high speed region.

5. A control method for actuation an induction motor in accordance with claim 4, wherein said first split winding has a larger number of turns than said second split winding.

* * * * *